(12) United States Patent
Vinski

(10) Patent No.: US 11,008,949 B2
(45) Date of Patent: May 18, 2021

(54) MULTI-SOURCE AIR SYSTEM AND SWITCHING VALVE ASSEMBLY FOR A GAS TURBINE ENGINE

(71) Applicant: PRATT & WHITNEY CANADA CORP., Longueuil (CA)

(72) Inventor: Johnny Vinski, Châteauguay (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 113 days.

(21) Appl. No.: 16/140,721

(22) Filed: Sep. 25, 2018

(65) Prior Publication Data

US 2020/0095931 A1   Mar. 26, 2020

(51) Int. Cl.
| | |
|---|---|
| F02C 6/08 | (2006.01) |
| F02C 9/18 | (2006.01) |
| F02C 3/04 | (2006.01) |
| F02C 7/32 | (2006.01) |

(52) U.S. Cl.
CPC ............... *F02C 9/18* (2013.01); *F02C 3/04* (2013.01); *F02C 6/08* (2013.01); *F02C 7/32* (2013.01)

(58) Field of Classification Search
CPC ...... F02C 9/18; F02C 6/08; F02C 3/13; F02C 7/18
See application file for complete search history.

(56) References Cited

U.S. PATENT DOCUMENTS

| | | | |
|---|---|---|---|
| 3,672,389 A * | 6/1972 | McConnell | B67D 1/105 137/99 |
| 3,738,107 A | 6/1973 | Miller | |
| 5,150,568 A * | 9/1992 | White | F02C 9/28 60/797 |
| 5,551,478 A | 9/1996 | Veilleux, Jr. et al. | |
| 6,189,324 B1 | 2/2001 | Williams et al. | |

(Continued)

FOREIGN PATENT DOCUMENTS

| | | |
|---|---|---|
| EP | 1923553 | 5/2008 |
| EP | 1923575 | 5/2008 |

(Continued)

OTHER PUBLICATIONS

European Search Report dated Feb. 24, 2020 for Application No. 19199680.0.

*Primary Examiner* — William H Rodriguez

(74) *Attorney, Agent, or Firm* — Norton Rose Fulbright Canada LLP

(57) ABSTRACT

A method of operating a gas turbine engine having a high pressure compressor and a secondary air system includes, when the gas turbine engine is operating in a first power range, providing a first bleed source for the secondary air system by bleeding air from a first bleed location, providing bleed air at a first pressure, proximate to an outlet of the high pressure compressor. When the gas turbine engine is operating in a second power range, higher than the first power range, the method includes providing a second bleed source by bleeding air from both a second bleed location and a third bleed location. The second and third bleed locations, respectively providing bleed air at second and third pressures, are both disposed upstream of the first bleed location within the gas turbine engine. The second and third pressures are different from the first pressure.

10 Claims, 5 Drawing Sheets

(56) References Cited

U.S. PATENT DOCUMENTS

| | | | |
|---|---|---|---|
| 8,430,202 B1* | 4/2013 | Mason | F01D 17/105 |
| | | | 181/210 |
| 10,054,051 B2 | 8/2018 | Foutch et al. | |
| 10,487,734 B2* | 11/2019 | Munsell | F01D 25/125 |
| 2005/0109016 A1* | 5/2005 | Ullyott | F01D 11/24 |
| | | | 60/282 |
| 2007/0241297 A1 | 10/2007 | Tanner et al. | |
| 2009/0104020 A1* | 4/2009 | Roush | F01D 25/12 |
| | | | 415/145 |
| 2009/0288421 A1* | 11/2009 | Zeiner | F02C 3/10 |
| | | | 60/792 |
| 2010/0083667 A1* | 4/2010 | Franconi | G05D 7/014 |
| | | | 60/795 |
| 2010/0286889 A1* | 11/2010 | Childers | F02C 6/08 |
| | | | 701/100 |
| 2011/0146602 A1* | 6/2011 | Kato | F01M 9/10 |
| | | | 123/90.12 |
| 2012/0045317 A1* | 2/2012 | Saladino | F02C 6/08 |
| | | | 415/145 |
| 2012/0180509 A1* | 7/2012 | DeFrancesco | F02C 9/18 |
| | | | 62/172 |
| 2012/0216545 A1* | 8/2012 | Sennoun | B64D 13/06 |
| | | | 60/772 |
| 2013/0101440 A1 | 4/2013 | Vogt | |
| 2013/0164115 A1* | 6/2013 | Sennoun | F02C 7/185 |
| | | | 415/1 |
| 2013/0187007 A1* | 7/2013 | Mackin | F02C 6/04 |
| | | | 244/134 R |
| 2014/0123666 A1* | 5/2014 | Ekanayake | F02C 3/305 |
| | | | 60/775 |
| 2014/0157791 A1* | 6/2014 | Saha | F01D 25/12 |
| | | | 60/785 |
| 2014/0250898 A1* | 9/2014 | Mackin | F02C 3/13 |
| | | | 60/772 |
| 2015/0233291 A1* | 8/2015 | Pelagatti | F02K 3/115 |
| | | | 60/782 |
| 2015/0233292 A1* | 8/2015 | Pelagatti | F02C 6/04 |
| | | | 60/782 |
| 2015/0275758 A1* | 10/2015 | Foutch | F02C 7/32 |
| | | | 60/779 |
| 2016/0169109 A1* | 6/2016 | Liu | F04D 29/522 |
| | | | 60/782 |
| 2017/0101937 A1* | 4/2017 | Schlarman | F02C 9/18 |
| 2017/0268430 A1* | 9/2017 | Schwarz | B64D 13/06 |
| 2017/0363003 A1* | 12/2017 | Evetts | B64D 29/00 |
| 2018/0128178 A1* | 5/2018 | Snape | F02C 7/18 |
| 2020/0248627 A1* | 8/2020 | Amari | F04D 25/16 |
| 2020/0309038 A1* | 10/2020 | Ng | F02C 6/08 |

FOREIGN PATENT DOCUMENTS

| | | |
|---|---|---|
| EP | 3321489 | 5/2018 |
| EP | 3333404 | 6/2018 |

\* cited by examiner

MULTI-SOURCE AIR SYSTEM AND SWITCHING VALVE ASSEMBLY FOR A GAS TURBINE ENGINE

TECHNICAL FIELD

The application relates generally to gas turbine engines and, more particularly, to the air systems of such engines.

BACKGROUND

Secondary air systems of gas turbine engines include means for bleeding off air from a location in the main gas path for uses elsewhere in the engine. Secondary air systems use compressed air, bled from the compressors, for non-combustive purposes such as sealing bearing cavities, assisting with oil scavenging, internal engine cooling, feeding a pneumatic system, meeting environmental control system (ECS) requirements of the aircraft, de-icing, etc. Typically, air is bled from one or more locations either upstream, within, or downstream from, a high pressure compressor.

It can be desirable to bleed air at different pressures, depending on operating modes of the engine and other requirements. Bleed air may therefore be bled from one of two locations within the compressor section of the engine. Air may be bled, for example, either from a location at the outlet of a high pressure compressor (i.e. "P3" air) or from a location upstream of the inlet of the high pressure compressor (i.e. "P2.5" air).

SUMMARY

In one aspect, there is provided a method of operating a gas turbine engine having a high pressure compressor and a secondary air system, the method comprising: when the gas turbine engine is operating in a first power range, bleeding air at a first pressure from a first bleed location, the first power range being a sub-idle engine operating condition; and when the gas turbine engine is operating in a second power range higher than the first power range, bleeding air from a second bleed location and a third bleed location, the second and third bleed locations disposed upstream of the first bleed location, the second bleed location and the third bleed location respectively providing bleed air at a second pressure and a third pressure.

In another aspect, there is provided an air system of a gas turbine engine, the air system comprising: a switching valve assembly operable to switch between a first bleed position and a second bleed position, wherein in the first bleed position the switching valve provides fluid flow communication between a first bleed air source at a first pressure and an outlet of the switching valve, and in the second bleed position the switching valve provides fluid flow communication between a second bleed air source and the outlet of the switching valve, the second bleed air source comprising two bleed air flows at second and third pressures, respectively.

In a further aspect, there is provided a centrifugal compressor of a gas turbine engine adapted to provide compressed air to a combustor, the centrifugal compressor comprising: an annular gas path, positioned around a centerline axis, for conveying air through the centrifugal compressor; an impeller comprising a plurality of blades protruding into the annular gas path and rotating within an impeller shroud, wherein air enters the impeller in a generally axial direction and exits the impeller in a generally radial direction; a first bleed opening arrangement located proximate to an outlet of the impeller for bleeding air at a first pressure from the annular gas path when the engine is operating in a first power range; and a second bleed opening arrangement located in the impeller shroud between an inlet of the impeller and the outlet of the impeller, for bleeding air at a second pressure from the annular gas path when the engine is operating in a second power range; a third bleed opening arrangement located proximate the inlet of the impeller for bleeding air at a third pressure from the annular gas path when the engine is operating in the second power range; and wherein the second pressure is less than the first pressure, the third pressure is less than the second pressure, and the second power range is higher than the first power range.

Further details of these and other aspects of the subject matter of this application will be apparent from the detailed description and drawings included below.

BRIEF DESCRIPTION OF THE DRAWINGS

Reference is now made to the accompanying figures in which.

DETAILED DESCRIPTION

Figure 1:
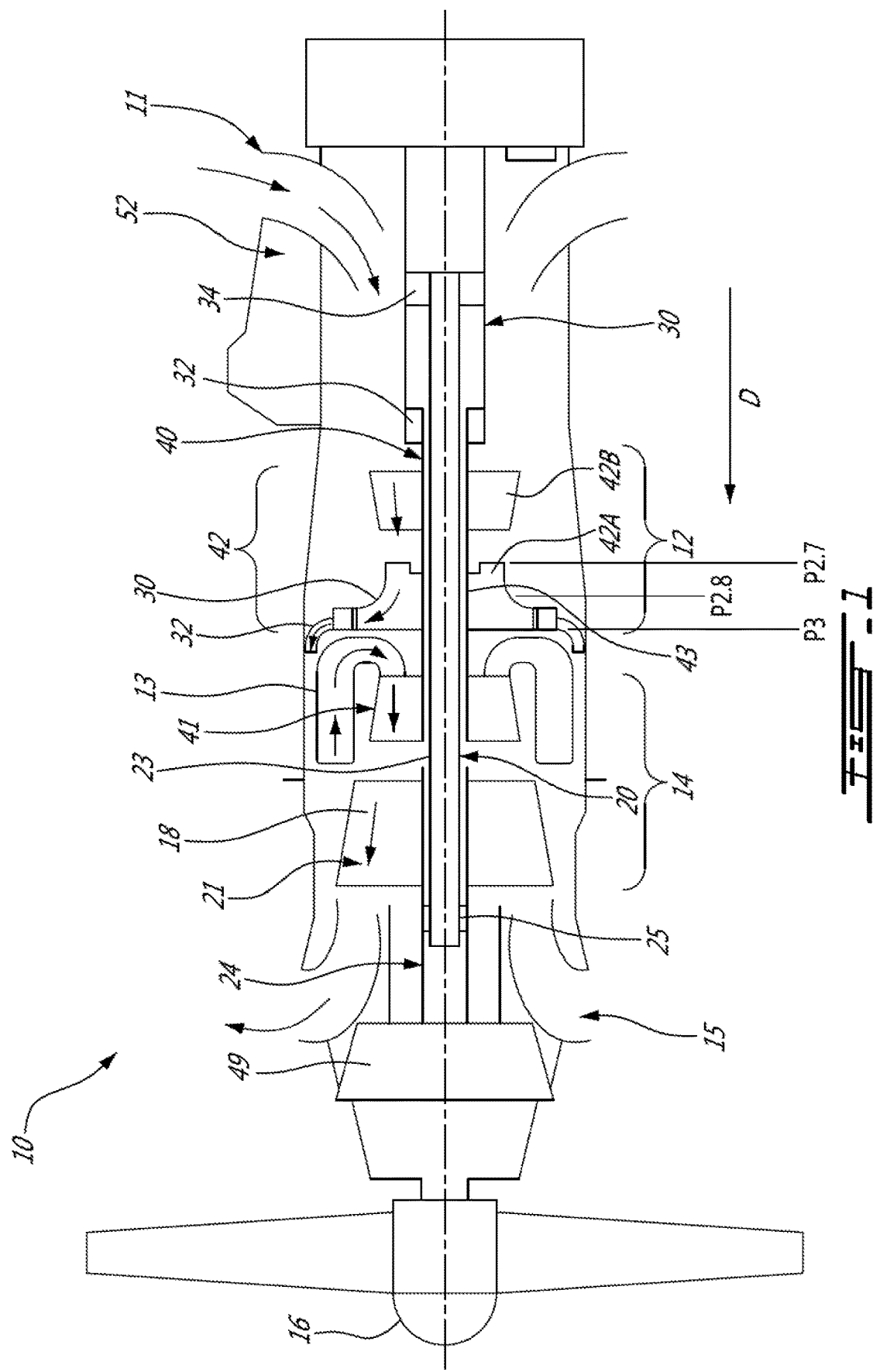
FIG. 1 is a schematic cross-sectional view of a gas turbine engine in accordance with a particular embodiment of the present disclosure.

FIG. 1 illustrates, schematically, a gas turbine engine 10 (sometimes referred to herein simply as "engine 10") of a type preferably provided for use in an aircraft for subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, and an exhaust outlet 15 through which the combustion gases exit the gas turbine engine 10. The gas turbine engine 10 has a longitudinal center axis 17. The air flow direction through the engine, when in operation, is shown schematically in FIG. 1 by arrows.

The engine 10 depicted in FIG. 1 is a turboprop engine, and therefore includes a propeller 16 driven by a power output of the engine to provide thrust. However, it is to be understood that the present disclosure may also be applicable to other types of gas turbine engines, including turboshafts and turbofans for example.

The gas turbine engine 10 has a central core 18 defining a gas path through which gases flow as depicted by flow arrows in FIG. 1. The exemplified engine 10 depicted in FIG. 1 is a "reverse-flow" engine 10 because gases flow through the core 18 from the air inlet 11, which is located at a rear end of the engine, to the exhaust outlet 15, which is located at forward end of the engine. The direction of the flow of gases through the core 18 of the engine 10 disclosed herein can be better appreciated by considering that the gases flow through the core 18 in the same direction D as the one along which the engine 10 travels during flight. Stated differently, gases flow through the engine 10 from an aft end thereof towards the propeller 16.

However, the features of the air system as described herein are similarly applicable to "through-flow" gas turbine engines, in which gases flow through the core of the engine from a forward end to a rearward (aft) end. In alternate embodiments, therefore, the engine 10 is a "through-flow" engine 10 where gases flow through the engine 10 from a forward end toward an aft end of the engine, in a direction opposite to the direction D away from the propeller 16.

It will be appreciated that the expressions "forward" and "aft" used herein refer to the relative disposition of components of the engine 10, in correspondence to the "forward" and "aft" directions of the engine 10 and an aircraft including the engine 10 as defined with respect to the direction of travel D. In the embodiment shown in FIG. 1, a component of the engine 10 that is "forward" of another component is arranged within the engine 10 such that it is located closer to the propeller 16. Similarly, a component of the engine 10 that is "aft" of another component is arranged within the engine 10 such that it is further away from the propeller 16.

The engine 10 of FIG. 1 has multiple spools which perform compression to pressurize the air received through the air inlet 11, and which extract energy from the combustion gases before they exit the core 18 via the exhaust outlet 15. According to the illustrated example, the engine 10 is provided in the form of a multi-spool engine having a low pressure (LP) spool 20 and a high pressure (HP) spool 40 independently rotatable about the center axis 17. However, it is understood that a multi-spool engine could have more than two spools. Alternately, the air system of the engine 10 as will be described is similarly application to single spool engine architecture. It is understood that the term "spool" as used herein is intended to broadly refer to drivingly connected turbine and compressor rotors and is, thus, not limited to a compressor and turbine assembly on a single shaft, and includes for example a rotary assembly with multiple shafts geared together.

The LP spool 20 of the engine 10 includes at least one component to extract energy from the combustion gases that is part of the turbine section 14. The LP spool 20 also includes at least one component to compress the air that is part of the compressor section 12. The LP spool 20 has a LP turbine 21 which extracts energy from the combustion gases. The LP turbine 21 (also referred to as the power turbine or "PT") drives an axially-extending LP shaft 23. The LP shaft 23 is coaxial with the central axis 17 of the engine 10 and extends forward of the LP turbine 21. The LP shaft 23 is not limited to the configuration depicted in FIG. 1, and can also mechanically couple to the LP turbine 21 in any other suitable way provided that a rotational drive is transmitted from the LP turbine 21 to the LP shaft 23. In the depicted embodiment, the LP turbine 21 is an axial rotatable component having an axis of rotation that is coaxial with the center axis 17. The LP turbine 21 can include one or more stages, depending upon the desired engine thermodynamic cycle, for example.

Still referring to FIG. 1, the engine 10 includes an output shaft 24. In the depicted embodiment, the output shaft 24 extends forwardly from the LP turbine 21 and is drivingly engaged thereto. In the illustrated example, the output shaft 24 is distinct from the LP shaft 23 and mechanically coupled thereto, for example by a spline 25 allowing for the transfer of torque between the output shaft 24 and the LP shaft 23. Other mechanical techniques can also be used to interconnect the LP and output shafts 23, 24. For example, the LP and output shafts 23, 24 can be interconnected by curvic coupling, pins, and interference fits. Other configurations of the output shaft 24 and the LP shaft 23 are also possible. For example, the output shaft 24 and the LP shaft 23 can be a single shaft driven by the LP turbine 21. The output shaft 24 therefore transfers the rotational output of the LP turbine 21 in a forward direction to drive another component.

A rotatable load, which in the embodiment shown includes the propeller 16, is mountable to the engine 10, and when mounted, is drivingly engaged (e.g. via a reduction gearbox 49) to the LP turbine 21, and is located forward of the LP turbine 21. In such a configuration, during operation of the engine 10, the LP turbine 21 drives the rotatable load such that a rotational drive produced by the LP turbine 21 is transferred to the rotatable load. The rotatable load can therefore be any suitable component, or any combination of suitable components, that is capable of receiving the rotational drive from the LP turbine 21. It is to be understood, however, that in an alternate embodiment wherein the engine 10 is a turbofan gas turbine engine, there may not be any rotational drive output.

Still referring to FIG. 1, the HP spool 40 has at least one component to compress the air that is part of the compressor section 12, and at least one component to extract energy from the combustion gases that is part of the turbine section 14. The HP spool 40 is also disposed along the axis 17 and includes an HP turbine 41 drivingly engaged to an HP compressor 42 by an HP shaft 43. In this embodiment, the HP shaft 43 rotates independently of the LP shaft 23, for example by having rotors of the HP turbine 41 and HP compressor 42 directly connected to the HP shaft 43. Similarly to the LP turbine 21, the HP turbine 41 and the HP compressor 42 can include various stages of rotary components.

The HP compressor 42 includes a centrifugal compressor 42A, which includes an impeller 30 and downstream diffuser passages 32, and one or more axial compressors 42B, all of which are driven by the HP turbine 41. During operation of the engine 10, the HP turbine 41 therefore drives the HP compressor 42.

Accordingly, the compressor section 12 of the engine 10 may be comprised of various stages, including the HP compressor 42, where the air is sequentially and increasingly pressurized via one or more axial and/or centrifugal compressors. As air proceeds through the main core gas passages of the compressor section 12 of the engine, a certain amount is extracted for non-combustive uses. This is known as bleed air. Bleed air is compressed air that is extracted (hereinafter "bled") from the compressor section 12 of the engine 10 when in operation, for purposes other than combustion in the combustor 16.

Bleed air (sometimes called "secondary air flow") may be used to provide pressurized air to various parts of the engine 10 and/or the aircraft, including for example sealing bearing cavities, assisting with oil scavenging, internal engine cooling, feeding a pneumatic system, feeding an environmental control system (ECS) of the aircraft, de-icing, etc. Each such system has air pressure and/or temperature requirements, which have an effect on where and how bleed air may or may not be taken to satisfy the requirements of each such system. For the purposes of the present disclosure, the system operable to bleed, distribute and handle the secondary air flow for any and/or all of such non-combustive air flow systems will be generally referred to herein as the "secondary air system" 50 (or simply "air system" 50).

For bleed air used for internal engine cooling and bearing cavity sealing, the compressed bleed air is typically bled from one of two possible locations within the compressor section 12 of the engine 10. Air may be bled, for example, either from a location downstream from the outlet of a high pressure compressor (i.e. air from station 3 station of the engine, or simply "P3" air) or from a location upstream of the inlet of the high pressure compressor (i.e. air from station 2.5 of the engine, or simply "P2.5" air).

When designing bleed air configurations, it is desirable to use as low a supply pressure as possible (i.e. as much upstream within the compressor section 12 as possible), because the energy that is used by the engine to compress the bleed air is therefore no longer available for propulsion purposes, with the consequent fuel consumption/efficiency loss. Therefore, existing bleed air configurations are typically such that, as engine operating pressure increases and a predetermined crossover point between the low pressure range (and therefore low engine power operating range) and the high pressure range (and therefore high engine power operating range) is reached, a switching valve is used to stop the bleed air being extracted from the P3 station (i.e. at the exit of the centrifugal compressor) and to start extracting the bleed air further upstream, at stations known as P2.# (with "#" typically being numbers between 0 and 9, with 0 referring to a location in the compression section 12 close to its inlet and 9 referring to a location in the compression section 12 close to its outlet). The reverse happens as engine operating pressure decreases. In other words, when the engine 10 is at low power, bleed air is extracted at P3 and, when the engine is operating at high power, bleed air is taken at P2.#.

The location proximate to, or immediately upstream from, the inlet of the impeller 30 of the HP centrifugal compressor 42A is known as P2.7 and the location within the impeller 30 of the HP centrifugal compressor 42A (i.e. between the inlet and outlet of this high pressure compression stage), is known as P2.8. The location immediately downstream of the impeller 30 of the HP centrifugal compressor 42A is known as P3. The pressure of P3 bleed air is thus greater than that of P2.8 bleed air, and the pressure of P2.8 bleed air is similarly greater than that of P2.7 bleed air.

As will be described in further detail below, when the engine is operating in a low power and low pressure range (i.e. when the aircraft is operating at low thrust or at high altitude), the bleed air for the secondary air system is bled at a higher pressure location within the compressor section (e.g. P3 air). When the engine is operating in a higher power and higher pressure range (i.e. when the aircraft is operating at higher thrust or at lower altitude), the air bleed for the secondary air system is bled from two different locations, both having a pressure lower than the P3.

More specifically, when the engine 10 is operating in a higher power range (e.g. a high power range wherein greater pressure is generated than in the above-noted "sub-idle" low power range), a second bleed source for the air system is provided by bleeding air from at least two different locations. More particularly, the second bleed source is provided by bleed extracted from both a second bleed location and a third bleed location, both of which are located upstream of the first bleed location of the first bleed source. The second bleed location and the third bleed location respectively providing bleed air at a second pressure (P2.8) and a third pressure (P2.7). The second pressure (P2.8) is less than the first pressure (P3), and the third pressure (P2.7) less than the second pressure (P2.8). Stated differently, P3>P2.8>P2.7.

Figure 5:
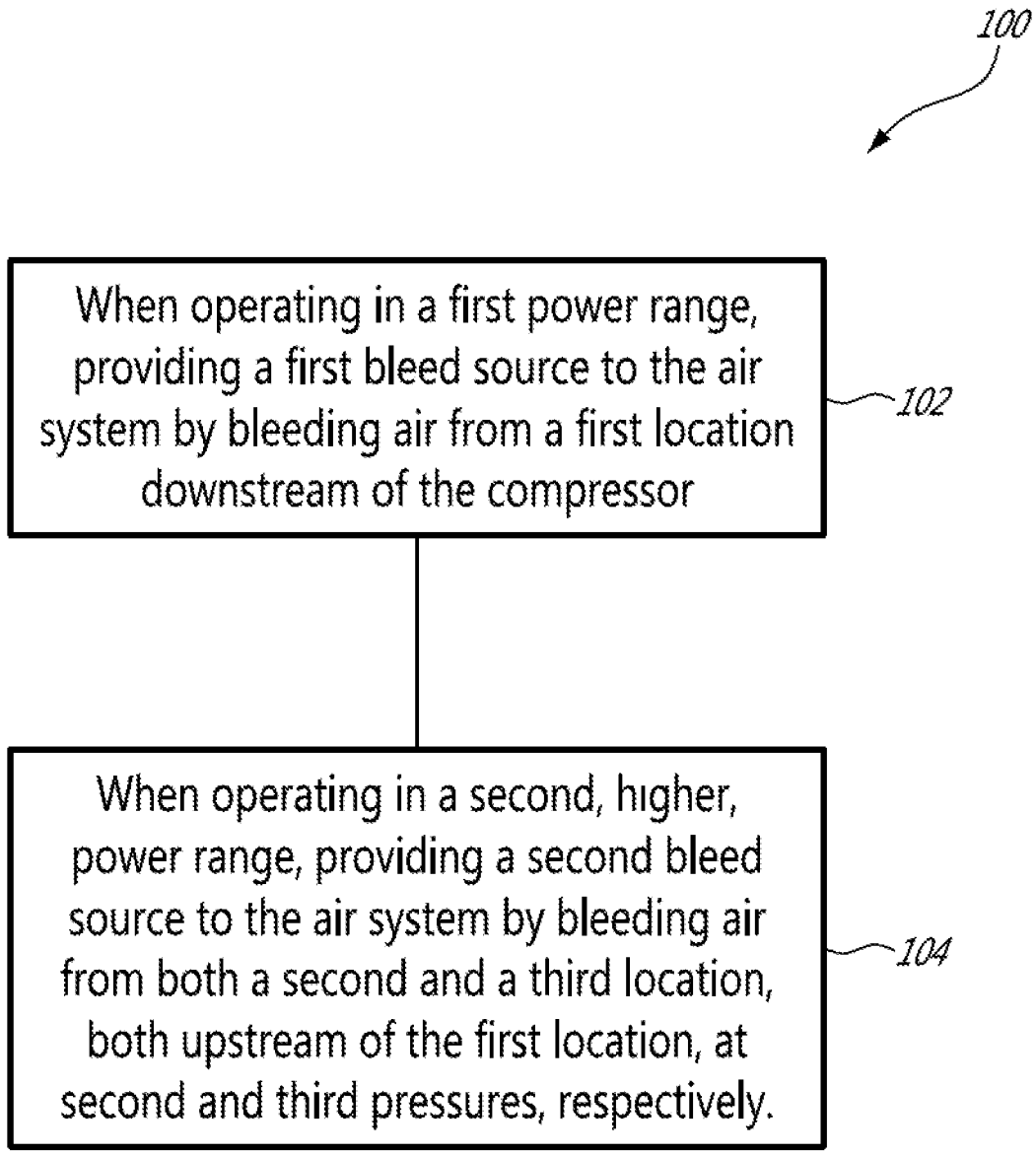
FIG. 5 is a flowchart of a method of operating the air system in accordance with a particular embodiment of the present disclosure.

With reference to FIG. 5 and pursuant to an embodiment of the present disclosure, therefore, a method 100 of operating the gas turbine engine 10 includes using two different bleed sources, one of which being provided with bleed air extracted from two different locations. More specifically, the present method 100 includes, when the gas turbine engine 10 is operating in a first (or low) power range, a step 102 of providing a first bleed source for the air system by bleeding air from a first bleed location at or downstream of an outlet of the compressor 12. This location may correspond to engine state 3, whereby P3 air provides the first bleed source, which is bled off immediately downstream of the impeller 30 of the HP centrifugal compressor 42A. The first bleed location therefore provides bleed air at a first pressure, such as P3. This first, or low, power range is understood to correspond to sub-idle engine operation.

The present method 100 further includes, when the gas turbine engine 10 is operating in a second (or high) power range, greater than the first (or low) power range, the step 104 of providing a second bleed source for the air system by bleeding air from both a second bleed location and a third bleed location. The second bleed location and the third bleed location are both disposed upstream of the first bleed location, and therefore the second bleed location and the third bleed location providing bleed air at a second pressure and a third pressure, respectively, which are different from each other and both less than the first bleed pressure. Accordingly, the second pressure less than the first pressure, and the third pressure less than the second pressure.

During operation of the engine 10, at low engine power running conditions (which may include, but is not limited to, a sub-idle operating range), the pressure of P2.7 air (bled proximate to an inlet of, or immediately upstream from, the HP impeller 30) and the pressure of P2.8 air (bled from within the HP impeller 30) may not be sufficient to feed the requirements of the air system. In such low power conditions, therefore, the higher pressure P3 air (bled downstream of the HP impeller 30) is used to feed the secondary air system 50.

However, at higher power conditions, P3 air may be relatively too hot and/or too "expensive" (performance-wise) to be bleed off for secondary air system uses. Accordingly, at such high power conditions (i.e. higher power than the afore-mentioned low power range), the secondary air system 50 switches the bleed source from the high pressure bleed source (e.g. P3 air) to a lower pressure bleed source. This lower pressure bleed source, however, is made up of air bled at two different locations and thus air at two different pressures (e.g. P2.7 and P2.8 air)—both of which are less than the pressure of the high pressure bleed source (e.g. P3 air). Thus, in high power conditions, a bleed source composed of two separate bleed air pressures which are bled from two different locations are provided, whereas in lower power conditions, the secondary air system 50 switches the bleed air source over to the single high pressure source provided by P3 air. This switching between the first and second bleed sources may be done using a switching valve assembly 60 of the secondary air system 50, as will be described further below.

Accordingly, the method 100 and air system 50 of the present disclosure provides means to switch between bleeding air from a higher pressure station for low power conditions, and bleeding air from at least two lower pressure stations for high power conditions. In one particular embodiment, the two lower pressure stations are P2.7 and P2.8 air, and the single higher pressure station is P3 air. This permits two different bleed sources to be used, each having different pressures and one (used for higher power conditions) being composed of two different bleed air feeds combined to form the second bleed source.

As the two lower pressure stations (P2.7 & P2.8) forming the high power bleed source may not be sufficient to provide adequate sealing and positive impeller bore flow at certain lower power conditions, the higher pressure station (P3) bleed can be used in such conditions. Conversely, at high power conditions the bleed air from the two lower pressure stations (P2.7 and P2.8) may be more efficient, given that using the higher pressure station (P3) air in such high power conditions would have an undesirable negative impact on engine performance. Stated simply, the present system and method therefore enables the secondary air system of the engine to switch between: i) a first bleed source composed of P3 air, for use in a low engine power range; and ii) both P2.7 & P2.8 bleed air combined to provide a second bleed source, for use in higher engine power ranges.

The terms "low power" and "high power" as used herein in connection with the engine operation ranges are understood to refer to power conditions which are lower and higher relative to each other. In other words, the low power operating range is understood to be less than the high power operating range. In a particular embodiment, the cross-over point between the low power range and the high power range is engine idle. Consequently, in this embodiment, the low power range is a "sub-idle" engine operating condition. Such a sub-idle engine operation condition may transiently occur, for example, during engine startup, engine shutdown, or alternately during operation as a result of an undesirable stall condition which may cause reduced rotation speeds (below an idle engine speed) of a compressor, etc. However, the low power range may also simply be within the normal operating power range of the engine, namely from idle to max power.

Figure 2:
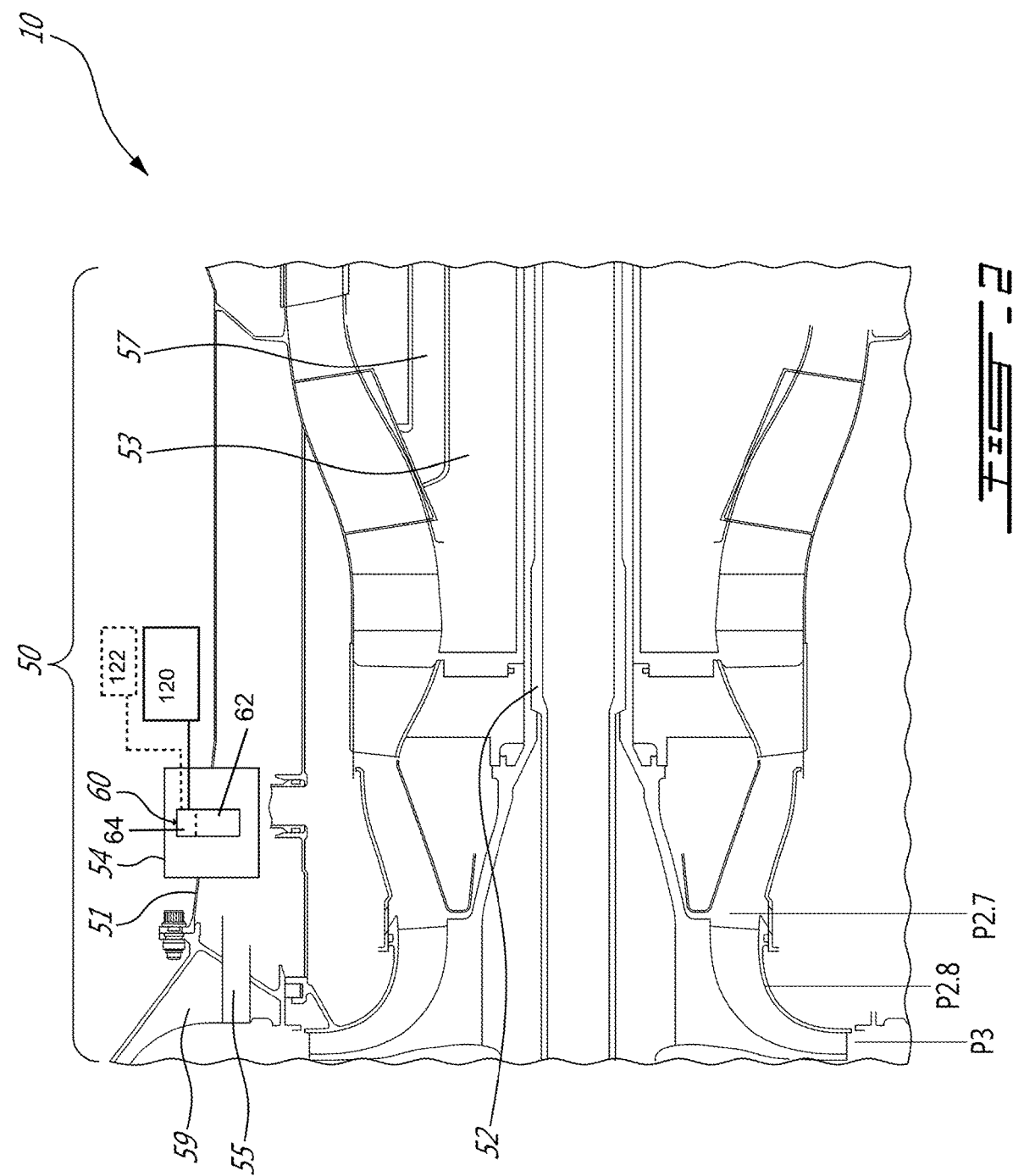
FIG. 2 is an enlarged schematic cross-sectional view of a compressor portion of the gas turbine engine of FIG. 1, showing portions of the air system.

Referring now to FIG. 2, the gas turbine engine 10 includes a secondary air system 50 (or simply "air system" 50) which is operable to perform the method 100 as described above. The air system 50 is therefore operable to bleed air from the main engine core air for distribution within the engine for the secondary airflow uses as outlined above, which include for example bearing cavity sealing, shaft sealing, turbine cooling, etc. The secondary air system 50 includes an air switching valve assembly 60, which may be mounted to an outer wall of the inter-compressor case 51 of the engine 10, within the region 54 located near a top side of the inter-compressor case 51.

The air switching valve assembly 60 is fluidly connected to three different bleed ports in the main gas flow (each at a different pressure), as will be described, and with the systems fed by the bleed air, both those internal to the engine 10 (such as bearing cavities 53, 55, 57 sealed by the bleed air) and external to the engine (such as aircraft ECS). In FIG. 2, bearing cavity 53 corresponds to an oil bearing cavity, bearing cavity 65 corresponds to the number 6 bearing cavity which may be sealed by P2.8 air, and bearing cavity 57 correspond to the bearing cavity comprising bearing numbers 2, 3, 4 and 5 which may be sealed by P2.7 air. The P2.7 bleed air may also be used for sealing the output shaft at region 52. Cavity 59 may be used for receiving P3 air for turbine cooling purposes.

Figure 3:
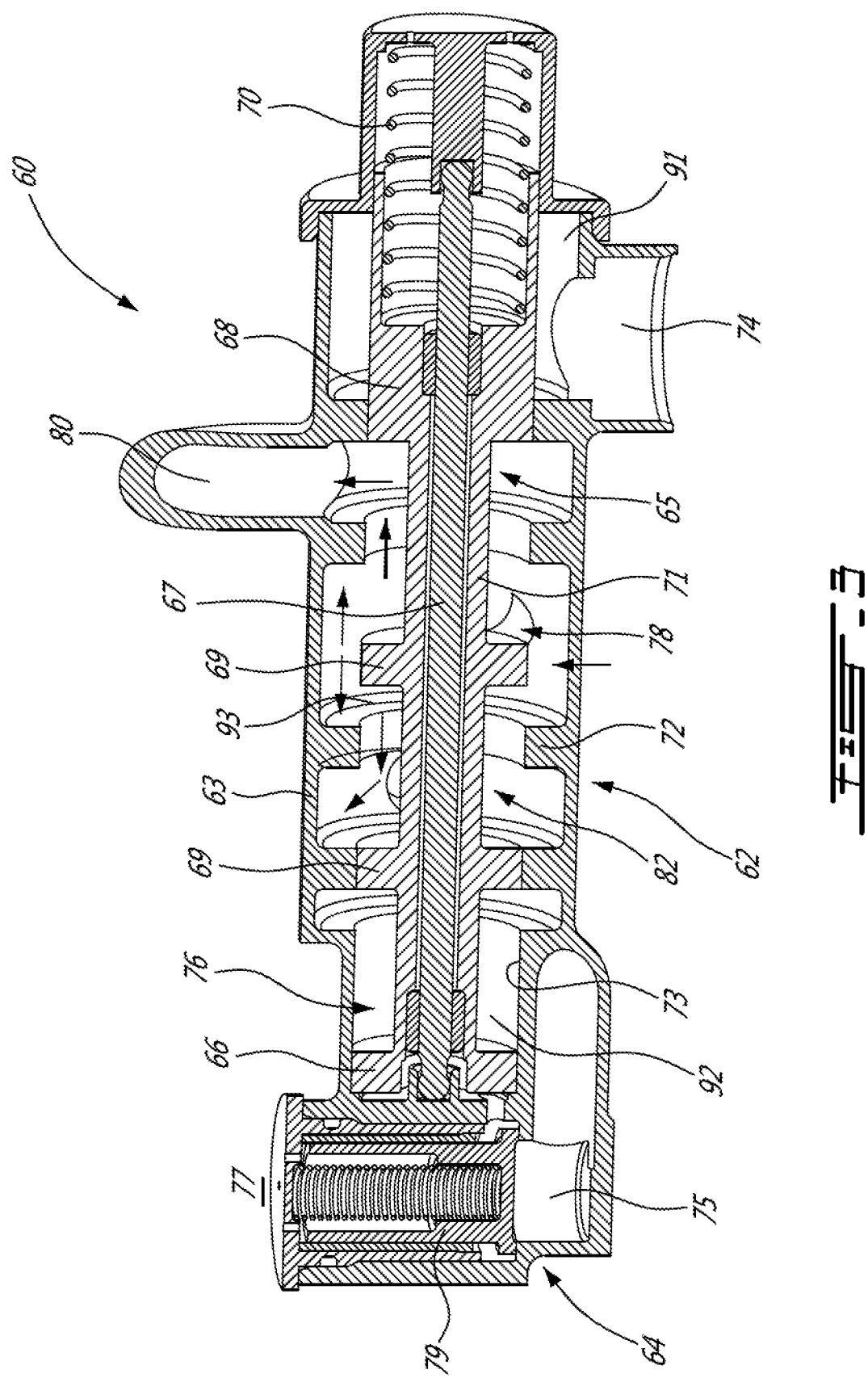
FIG. 3 is a cross-sectional view of a switching valve of the air system of FIG. 2, the switching valve shown in a first, low power, position.
Figure 4:
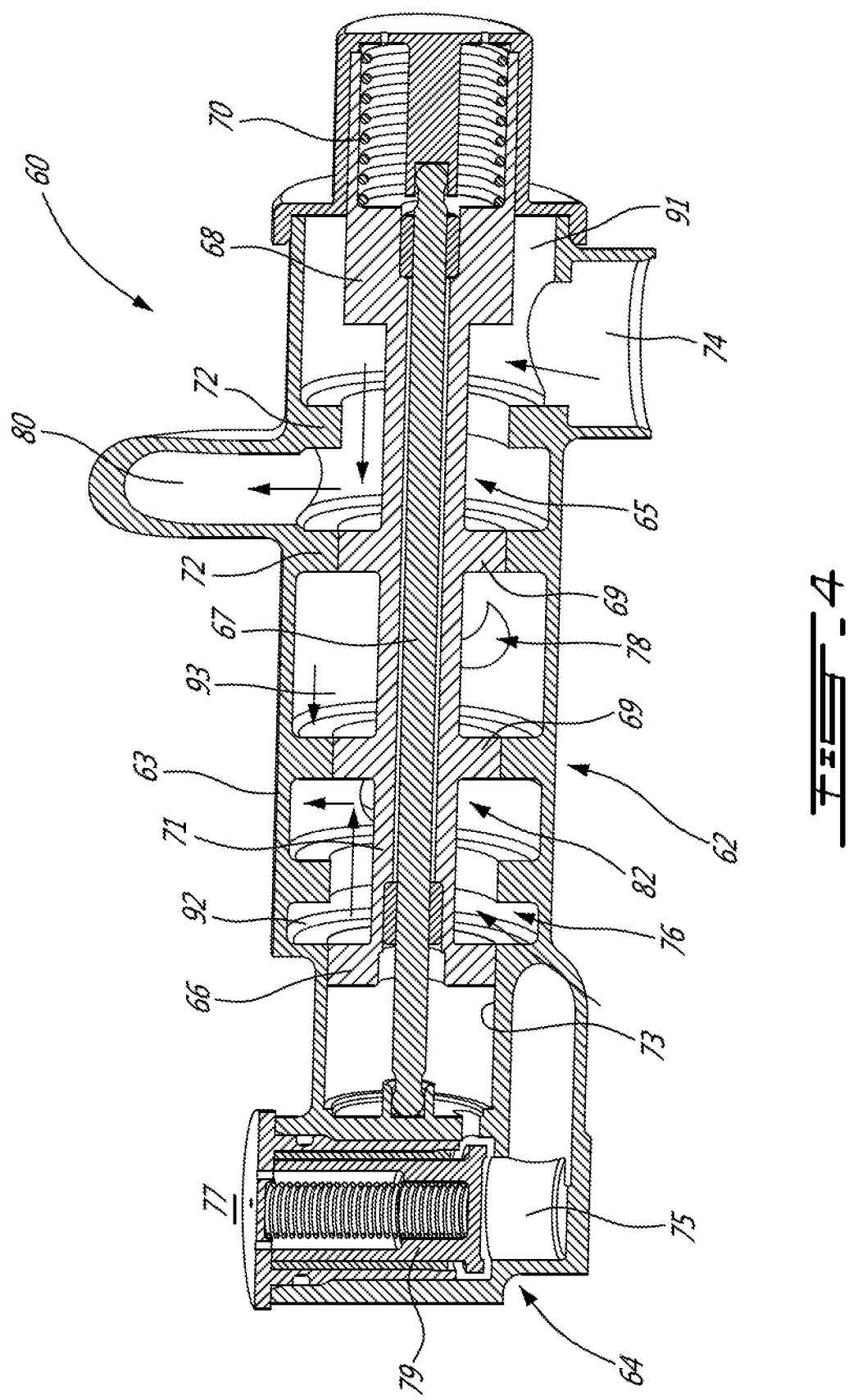
FIG. 4 is a cross-sectional view of the switching valve of the air system of FIG. 2, the switching valve shown in a second, high power, position.

Referring now to FIGS. 3 and 4, the air switching valve assembly 60 will now be described in further detail.

The air switching valve assembly 60 includes generally a main switching valve 62 and, in at least the embodiments of FIGS. 3 and 4, a pilot valve 64. The pilot valve 64 permits quicker actuation of the main switching valve 62, such as to switch between bleed air sources. The pilot valve 64 may be either pneumatically or electronically controlled, as described further below.

In one particular embodiment, the main switching valve 62 is a spool valve. The spool valve 62 does not have seals, in order to help prevent jamming of the valve and variability due to friction. The spool valve 62 instead has tightly controlled gaps to minimize the leakage flow and impact on performance. The leakage to ambient in the high power position (FIG. 4) is minimized by a valve seat contact on both the pilot valve 64 and the piston (or "spool") 65 of the main switching valve 62.

The spool-type main switching valve 62 includes a cylindrical housing 63 within which a piston 65 is displaceable between at least a first piston position (as shown in FIG. 3) and a second piston position (as shown in FIG. 4). The piston 65 slides along a stationary central guide pin 67, and is biased towards one of the two positions (namely, the first position of FIG. 3) by a biasing element 70, such as a spring or other suitable resilient member. As can be seen in FIGS. 3 and 4, the piston 65 includes a piston body 71, and first and second piston heads 66 and 68 which are respectively disposed at opposite ends of the piston body 71. The piston 65 includes sealing flanges 69, which are disposed on the piston body 71 longitudinally between the first and second piston heads 66, 68 on either end of the piston body 71. These sealing flanges 69 project radially outwardly from the central piston body 71. Select ones of the first piston head 66, the projecting sealing flanges 69, and the second piston head 68, are configured to sealingly abut corresponding stationary flanges 72 of the housing 63 and/or an inwardly facing cylinder surfaces 73, in each of the first position potion (as shown in FIG. 3) and the second piston position (as shown in FIG. 4). The sealing flanges 69 of the piston 65 and the cooperating stationary flanges 72 of the housing 63 may cooperate using valve seats to accordingly form radial metallic seals which act to seal the high pressure bleed air (P3) from ambient air.

In a particular embodiment, the main switching valve 62 of the air switching valve assembly 60 includes three inlet ports 74, 76 and 78, and two outlet ports 80 and 82, all of which are in fluid communication with different portions of the internal chambers of the piston body 71, as will be explained. More particularly, a first inlet port 74 provides fluid flow communication between a first low pressure bleed air source (e.g. P2.7 air) and a first chamber 91 within the piston body 71 located a first end of the main switching valve 62. The second inlet port 76 provides fluid flow communication between a second, medium pressure bleed air source (e.g. P2.8 air) and a second chamber 92 within the piston body 71 at a second, opposed, end of the main switching valve 62. The third inlet port 78 provides fluid flow communication between a third, high pressure bleed air source (e.g. P3 air) and a third chamber 93 centrally within the piston body 71 at a point between the first and second ends of the main switching valve 62.

The first outlet port 80 of the main switching valve 62 provides an outlet for the low pressure bleed air (e.g. P2.7 air) within the first chamber 91 of the piston body when the piston 65 is in the second piston position (as shown in FIG. 4). Accordingly, in this piston position (FIG. 4), the low pressure bleed air inters via the first inlet port 74 and exits via the first outlet port 80. When the piston 65 is in the first piston position (as shown in FIG. 3), however, the low pressure bleed air (e.g. P2.7 air) is prevented from flowing between the first inlet port 74 and the first outlet port 80. As can be seen from FIGS. 3 and 4, the first outlet port 80 remains open in both the first and second positions of the piston 65. However, the first outlet port 80 is connected with different inlet sources in each of the first and second piston positions (FIGS. 3 and 4). More specifically, in the first piston/valve position as shown in FIG. 3, the first outlet port 80 is in fluid flow communication with the third inlet port 78 only, and is sealed off from the first and second inlet ports 74, 76. In the second piston/valve position as shown in FIG. 4, the first outlet port 80 is in fluid flow communication with the first inlet port 74 only, and is sealed off from the second and third inlet ports 76, 78.

The second outlet portion 82 provides an outlet for the medium pressure bleed air (e.g. P2.8 air) within the second chamber 92 of the piston body 71. As can be seen from FIGS. 3 and 4, the second outlet port 82 remains open in both the first and second positions of the piston 65. However, the outlet port 82 is connected with different inlet sources in each of the first and second piston positions (FIGS. 3 and 4). More specifically, in the first piston/valve position as shown in FIG. 3, the second outlet port 82 is in fluid flow communication with the third inlet port 78 only, and is sealed off from the first and second inlet ports 74, 76. In the second piston/valve position as shown in FIG. 4, the second outlet port 82 is in fluid flow communication with the second inlet port 76 only, and is sealed off from the second and third inlet ports 76, 78.

The pilot valve 64 includes an inlet port 75 at its inner end which receives low pressure bleed air from the low pressure source (e.g. P2.7 air), and is open to atmosphere at its opposed end 77. The pilot valve 64 includes a biased piston 79 which is displaced within the pilot valve chamber by pressure differential, as explained below.

In the depicted embodiment, the pilot valve 64 is pneumatically operated and controlled. For example, the pilot valve 64 of FIGS. 3 and 4 may be actuated by a pressure differential (i.e. a delta pressure) between the low pressure bleed air (e.g. P2.7) received via its inlet portion 75 and the ambient air pressure Pamb at the opposite end 77 of the pilot valve. The low pressure bleed air is fed into the pilot valve at inlet port 75, and the pilot valve is open to the ambient air pressure ($P_{amb}$) at 77. The pilot valve 64 is designed to actuate once the low pressure bleed air (e.g. P2.7) is adequate for the air system 50. The valve stroke of the pilot valve 64 is relatively small (in comparison with the valve stroke of the main switching valve 62) to ensure quick response and to reduce hysteresis between opening and closing of the pilot valve 64. The valve area of the pilot valve 64 that is exposed to the low pressure bleed air is the same when the pilot valve 64 is opened and closed, which may also reduce hysteresis between opening and closing of the pilot valve 64.

As described above with reference to the method 100, the air switching valve assembly 60 of the air system 50 is operable to switch between bleeding air from a higher pressure station (e.g. P3) for low power conditions, and bleeding air from two different lower pressure stations (e.g. P2.7 and P2.8) for high power conditions. This permits two different bleed sources to be used, each having different pressures and one (that used for higher power conditions) being composed of two different bleed air feeds combined to form the second bleed source.

Accordingly, referring to FIG. 3, when the air switching valve assembly 60 is in the first valve position (as shown in FIG. 3), this corresponds to the low power position when air is bled from the higher pressure station (e.g. P3). When the air switching valve assembly 60 is in the first valve position (as shown in FIG. 3), therefore, in the main switching valve 62 both the low pressure bleed inlet port 74 and the medium pressure bleed inlet port 76 communicate with air at ambient pressure ($P_{amb}$) via the radial sealing flanges. Similarly, in the pilot valve 64, the low pressure bleed inlet port 75 is also open to ambient pressure $P_{amb}$ at 77. In order to bleed the high pressure air (e.g. P3) in order to supply the air system 50 high pressure air, in this valve position (FIG. 3), the third inlet port 78 (which is connected to the high pressure bleed source—e.g. P3) is in fluid communication with both the first and second outlet ports 80 and 82.

As the P2.7 pressure increases, therefore, it eventually becomes sufficiently great to overcome the spring force of the biasing piston 79 of the pilot valve 64, and subsequently the P2.7 air acts against the piston 65 to move it, and thereby stop the flow of high pressure bleed air (P3) and replace it instead by two different lower pressure bleed air sources (P2.7 and P2.8).

Referring now to FIG. 4, when the air switching valve assembly 60 is in the second valve position (as shown in FIG. 4), this corresponds to the high power position when air is bled from two different lower pressure stations (e.g. P2.7 and P2.8)—or more specifically from a low pressure station and a medium pressure station. When the air switching valve assembly 60 is in the second valve position (as shown in FIG. 4), the switching valve is positioned such that bleed air from the two different lower pressure sources (e.g. P2.7 and P2.8) is allowed to flow, in parallel, from the respective bleed sources to the outlet ports 80 and 82 of the valve assembly 60, and thereby to supply the air system 50 with lower pressure air. In this second valve position (FIG. 4), therefore, the low pressure bleed air which enters via the first inlet port 74 is allowed to flow through the first chamber 91 and out the first outlet port 80, and the medium pressure bleed air which enters via the second inlet port 76 is allowed to flow between the second chamber 92 and the second outlet port 82. In this second valve position (FIG. 4), however, the high pressure air (e.g. P3) which would enter via the third inlet port 78 is prevented from reaching the first and second outlet ports 80 and 82 by the sealing flanges 69 of piston 65 and the cooperating stationary flanges 72 of the housing 63. As such, the high pressure air inlet is blocked by the valve assembly 60 in this second position.

In this manner, the air switching valve assembly 60 is operable to switch between two air system sources (e.g. P2.7 & P2.8) in the second valve position (FIG. 4) and a third higher pressure source (e.g. P3) in the first valve position (FIG. 3).

The air switching valve assembly 60 may be pneumatically controlled by a pneumatic controller 120 of the air system 50 (see FIG. 2), which is operable for example to activate the air switching vavle 60, and the pilot valve 64 thereof, by a pressure differential (for example, the difference between the low pressure bleed air (P2.7) and the ambient air pressure ($P_{amb}$). The delta pressure across the main switching valve 62 of the air switching valve assembly 60 is equal when the pilot valve 64 is closed (i.e. $P_{amb}$ on both sides). Once the pilot valve 64 is opened, the low pressure bleed air (e.g. P2.7) acts on one side of the piston 65 to counteract the spring force generated by the biasing element 70. This causes the air system 50 to switch air source, namely between the high pressure bleed source (e.g. P3) in the first position of the piston 65 (as shown in FIG. 3) and the two lower pressure bleed sources (e.g. P2.7 and P2.8) in the second position of the piston 65 (as shown in FIG. 4).

In an alternate embodiment, however, the air switching valve assembly 60 may be electronically controlled, for example by an electronic controller 122 of the air system 50 (see FIG. 2) that is in communication with the main switching vavle 62 and/or the pilot valve 64 of the air switching vavle 60. One or both of the main switching vavle 62 and the polot vavle 64 may thus, in this embodiment, be electrically actuated and controlled solenoid vavles. In one particular embodiment of such an electronically controlled air switching valve assembly, the main switching valve 62 may be activated by a greater pressure differential (for example, the difference between the high pressure bleed air (P3) and the ambient air pressure ($P_{amb}$), wherein the higher activation pressure (P3) is supplied by an electronically controlled solenoid valve. The P3 activation pressure may also be injected remotely via a tube connected to the pilot valve 64. In such an alternate embodiment, the higher pressure bleed air (e.g. P3) is fed to the inlet port 75 of the pilot valve 64, both when the valve is in the first valve position (FIG. 3) and the second valve position (FIG. 4). Thus, in this alternate embodiment, the air switching valve still includes both a main switching valve 62 and a pilot valve 64, however the electronically controlled solenoid is used to actuate the pilot valve 64.

In another alternate embodiment, the air switching valve assembly can do away with the pilot valve entirely, and the air switching valve assembly includes a main switching valve and an electronically controlled solenoid valve. The solenoid valve in this embodiment thus replaces the pilot valve entirely, and may use a smaller pressure differential (e.g. between the high pressure bleed air (P3) and the medium pressure bleed air (P2.8). The activation pressure (e.g. P3) is therefore supplied via the electronically controlled solenoid valve. In this embodiment, when the main switching valve is in the first valve position (e.g. FIG. 3), the solenoid valve is closed and thus the inlet port 75 is exposed to the medium pressure air (P2.8). When the main switching valve is in the second valve position (e.g. FIG. 4), however, the solenoid is opened so that the inlet port 75 is exposed to the high pressure bleed air (P3).

The above description is meant to be exemplary only, and one skilled in the art will recognize that changes may be made to the embodiments described without departing from the scope of the invention disclosed. For example, although the embodiments above are described in the context of a gas turbine engine with at least one centrifugal compressor (i.e. having an impeller) and the bleed locations are disposed at multiple locations upstream of, within, and downstream of, the impeller, it is to be understood that the present disclosure may similarly be applicable to one or more axial compressor stages of a gas turbine engine. Additionally, although the high, medium and low pressure bleed air sources are described above as being P3, P2.8 and P2.7 bleed air, respectively, it is to be understood that the three bleed air sources may be taken from other stations within the engine. Furthermore, other bleed opening arrangements, in addition to or in combination with the bleed air arrangements and methods described above, may also be found in the gas turbine engine. Still other modifications which fall within the scope of the present invention will be apparent to those skilled in the art, in light of a review of this disclosure, and such modifications are intended to fall within the appended claims.

The invention claimed is:

1. A method of operating a gas turbine engine having a high pressure compressor and a secondary air system, the method comprising;
    operating the gas turbine engine within a first power range, and bleeding air from a first bleed source of the gas turbine engine, the first bleed source providing air at a first pressure from a first bleed location within the high pressure compressor of the gas turbine engine, the first power range being a sub-idle engine operating condition;
    operating the gas turbine engine within a second power range higher than the first power range, and bleeding air from a second bleed source of the gas turbine engine, the second bleed source including a second bleed location and a third bleed location within the high pressure compressor of the gas turbine engine, the second bleed location and the third bleed location being disposed upstream of the first bleed location, the second bleed location and the third bleed location respectively providing bleed air at a second pressure and a third pressure; and
    using a switching vavle to switch between the first bleed source and the second bleed source, the switching valve including a pilot valve therein, including operating the pilot valve to actuate the switching valve to switch between the first bleed source and the second bleed source; and
    bleeding air either from the first bleed source or the second bleed source.

2. The method as defined in claim 1, wherein the second pressure is less than the first pressure, and the third pressure is less than the second pressure.

3. The method as defined in claim 1, wherein the first bleed location is proximate to an outlet of the high pressure compressor.

4. The method as defined in claim 1, wherein the second location is disposed downstream of an inlet of the high pressure compressor and upstream of the outlet of the high pressure compressor.

5. The method as defined in claim 4, wherein the third bleed location is disposed proximate to the inlet of the high pressure compressor.

6. The method as defined in claim 1, wherein bleeding air from the first bleed location comprising bleeding P3 air from a location proximate an outlet of the high pressure compressor of the gas turbine engine, bleeding air from the second bleed location comprises bleeding P2.8 air from a location between an inlet and the outlet of the high pressure compressor, and bleeding air from the third bleed location comprises bleeding P2.7 air from a location proximate to the inlet of the high pressure compressor.

7. The method as defined in claim 1, wherein the pilot valve is pneumatically controlled, the method further comprising using a pressure differential to actuate the pilot valve.

8. The method as defined in claim 1, wherein the pilot valve is electronically controlled, the method further comprising using an electronically actuated solenoid to actuate the pilot valve.

9. The method as defined in claim 1, further comprising using an electronically controlled solenoid valve to actuate the switching valve to switch between the first bleed source and the second bleed source.

10. The method as defined in claim 1, wherein the switching valve is a spool-type valve.

* * * * *